United States Patent
Herman et al.

(10) Patent No.: US 9,504,947 B2
(45) Date of Patent: Nov. 29, 2016

(54) AIR FILTER ASSEMBLIES AND CARRIER FRAMES HAVING VORTEX-GENERATING FLOW GUIDE

(71) Applicant: Cummins Filtration IP, Inc., Columbus, IN (US)

(72) Inventors: Peter K. Herman, Stoughton, WI (US); Scott W. Schwartz, Cottage Grove, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 107 days.

(21) Appl. No.: 14/029,904

(22) Filed: Sep. 18, 2013

(65) Prior Publication Data
US 2014/0130467 A1     May 15, 2014

Related U.S. Application Data

(60) Provisional application No. 61/725,511, filed on Nov. 13, 2012.

(51) Int. Cl.
| | |
|---|---|
| *B01D 50/00* | (2006.01) |
| *B01D 46/00* | (2006.01) |
| *B01D 45/12* | (2006.01) |
| *B01D 45/16* | (2006.01) |
| *B01D 45/08* | (2006.01) |
| *B01D 46/12* | (2006.01) |

(52) U.S. Cl.
CPC ........... *B01D 46/0049* (2013.01); *B01D 45/08* (2013.01); *B01D 45/12* (2013.01); *B01D 45/16* (2013.01); *B01D 46/0023* (2013.01); *B01D 46/125* (2013.01); *B01D 50/002* (2013.01)

(58) Field of Classification Search
CPC ............ B01D 46/0049; B01D 46/125; B01D 46/0023
USPC ...... 55/337, 414, 456, 457, 447, 459.1, 416, 55/462–465; 96/414, 422
See application file for complete search history.

(56) References Cited

U.S. PATENT DOCUMENTS

| | | |
|---|---|---|
| 3,719,080 A | 3/1973 | Burgess |
| 3,890,838 A | 6/1975 | Paetzold |
| 3,966,443 A * | 6/1976 | Okano et al. .................. 55/337 |
| 4,729,776 A | 3/1988 | Elliff |
| 4,929,088 A | 5/1990 | Smith |
| 4,981,368 A | 1/1991 | Smith |
| 5,476,012 A | 12/1995 | Takashima |
| 5,595,157 A | 1/1997 | Siew et al. |
| 6,149,700 A | 11/2000 | Morgan et al. |
| 6,267,006 B1 | 7/2001 | Bugli et al. |
| 6,391,076 B1 | 5/2002 | Jaroszczyk et al. |
| 7,314,558 B1 | 1/2008 | Jaroszczyk et al. |
| 7,323,106 B2 | 1/2008 | Jaroszczyk et al. |

(Continued)

OTHER PUBLICATIONS

Vortab Company, Flow Conditioners, Flow Straighteners, www.vortab.com, website visited Aug. 26, 2013.

(Continued)

*Primary Examiner* — Dung H Bui
(74) *Attorney, Agent, or Firm* — Foley & Lardner LLP

(57) ABSTRACT

Air filter assemblies and carrier frames have a plurality of vortex-generating flow guides normalizing air flow to a uniform velocity profile downstream thereof. The airflow having the uniform velocity profile travels across a mass airflow sensor.

22 Claims, 9 Drawing Sheets

(56) References Cited

U.S. PATENT DOCUMENTS

| | | |
|---|---|---|
| 7,540,895 B2 | 6/2009 | Furseth et al. |
| 7,879,125 B2 | 2/2011 | Haberkamp et al. |
| 2006/0065592 A1 | 3/2006 | Terres et al. |
| 2008/0011673 A1 | 1/2008 | Janikowski et al. |
| 2008/0250776 A1* | 10/2008 | Brown et al. .................. 60/299 |
| 2009/0241315 A1 | 10/2009 | Menez et al. |
| 2010/0107617 A1* | 5/2010 | Kaiser ................ B01F 3/04049 60/324 |
| 2011/0005397 A1* | 1/2011 | Dackam et al. ................ 96/422 |
| 2011/0036082 A1 | 2/2011 | Collinot |
| 2011/0146254 A1 | 6/2011 | Yi et al. |
| 2012/0210697 A1 | 8/2012 | Garimella et al. |
| 2013/0062276 A1 | 3/2013 | Barreteau et al. |
| 2013/0199143 A1* | 8/2013 | Zou et al. ....................... 55/502 |
| 2014/0260984 A1* | 9/2014 | Morgan .......................... 95/287 |

OTHER PUBLICATIONS

International Search Report and Written Opinion for International Application No. PCT/US13/63264, dated Feb. 11, 2014, 14 pages.

* cited by examiner

AIR FILTER ASSEMBLIES AND CARRIER FRAMES HAVING VORTEX-GENERATING FLOW GUIDE

CROSS-REFERENCE TO RELATED APPLICATION

The present U.S. Utility Patent Application claims the benefit of and priority to U.S. Provisional Patent Application Ser. No. 61/725,511, filed Nov. 13, 2012, which hereby is incorporated herein by reference.

FIELD AND BACKGROUND

The present disclosure relates to air filter assemblies and carrier frames for air filter assemblies, particularly air filter assemblies having an airflow sensor. The present disclosure arose during continuing development efforts directed toward air filtration.

U.S. Pat. No. 6,391,076, the disclosure of which is hereby incorporated herein by reference in entirety, discloses a full flow fluid filter having a housing extending axially along an axis, and a pleated filter element having a plurality of pleats in a closed loop annulus having an outer perimeter defined by a plurality of outer pleat tips, an inner perimeter defined by a plurality of inner pleat tips, and a hollow interior extending along the axis. Fluid flows substantially directly axially through the filter element, with minimal bending and change of direction, minimizing flow restriction.

U.S. Patent Publication No. 2006/0065592, the disclosure of which is hereby incorporated herein by reference in entirety, discloses a direct flow filter having seal tips alternately sealing upstream and/or downstream ends of wall segments to each other to define first and second sets of flow channels and protecting the ends of the wall segments from damage, including upstream ends from incoming debris, and providing structural support withstanding high flow rates and improving flow by means of the geometry of the seal.

U.S. Pat. No. 7,314,558, the disclosure of which is hereby incorporated herein by reference in entirety, discloses a pleated panel fluid filter filtering fluid flowing along an axial flow direction and includes angled panels and/or progressively increasing flow channel width and/or skewed panel projections and/or flattened pleat tip bend lines.

U.S. Pat. No. 7,323,106, the disclosure of which is hereby incorporated herein by reference in entirety, discloses a filter with multiple pleated filter elements having axially extending channels having a transverse pleat channel height and a lateral channel width. The pleated filter elements have different channel heights.

U.S. Pat. No. 7,540,895, the disclosure of which is hereby incorporated herein by reference in entirety, discloses a filter including a housing with multiple flow passages and filter elements, including at least first and second flow passages therethrough including respective first and second filter elements in parallel. Respective internal, dividing walls separate flow passages in space saving relation.

U.S. Patent Publication No. 2008/0011673, the disclosure of which is hereby incorporated herein by reference in entirety, discloses a direct flow filter having one or more upstream and/or downstream face seals transversely spanning from one set of pleat tips at least partially towards the other set of pleat tips and laterally spanning adjacent channels.

U.S. Pat. No. 7,879,125, the disclosure of which is hereby incorporated herein by reference in entirety, discloses a filter provided by pleated filter media having a plurality of pleats defined by wall segments extending axially along an axial direction along an axis and extending transversely along a transverse direction between first and second sets of pleat tips at first and second sets of axially extending bend lines. The pleated filter media spans laterally along a lateral span along a lateral direction, with the wall segments being spaced from each other by lateral gaps. The pleats have a pleat depth along the transverse direction along the wall segments between the first and second sets of pleat tips. The pleat depth varies as the pleated filter media spans laterally along the lateral direction.

U.S. Patent Publication No. 2013/0062276, the disclosure of which is hereby incorporated herein by reference in entirety, discloses a pleated filter element comprising a plurality of pleats comprised of pleat segments extending in an axial direction between first and second axial ends and extending in a transverse direction that is perpendicular to the axial direction between first and second sets of pleat tips at least partially defined by first and second sets of bend lines. Axial flow channels are defined between the pleat segments in the lateral direction and the plurality of pleats has a width in the transverse direction that varies along the axial direction.

SUMMARY

In certain examples disclosed herein, carrier frames are for supporting air filter elements having a dirty air inlet and a clean air outlet and filtering air flowing therethrough from upstream to downstream. The carrier frames can have an exit side at the clean air outlet, the exit side having at least one vortex-generating flow guide promoting rapid mixing of clean air downstream of the air filter element and normalization of a uniform velocity profile downstream thereof for flow to a mass airflow (MAF) sensor, to thereby minimize MAF variation due to imperfect air filter element construction.

In certain examples disclosed herein, air filter assemblies have a filter element that filters air flowing from an upstream inlet to a downstream outlet. A carrier frame carries the filter media. A plurality of vortex-generating flow guides are located at the outlet. The plurality of vortex-generating flow guides normalize airflow to a uniform velocity profile downstream thereof. A MAF sensor is provided across which the airflow having the uniform velocity profile travels.

DETAILED DESCRIPTION

In the present description, certain terms have been used for brevity, clearness and understanding. No unnecessary limitations are to be implied therefrom beyond the requirement of the prior art because such terms are used for descriptive purposes only and are intended to be broadly construed. The different air filter assemblies and carrier frames described herein may be used alone or in combination with other apparatuses. Various equivalents, alternatives and modifications are possible within the scope of the appended claims. Each limitation in the appended claims is intended to invoke interpretation under 35 U.S.C. Section 112, sixth paragraph only if the terms "means for" or "step for" are explicitly recited in the respective limitation.

Figure 1:
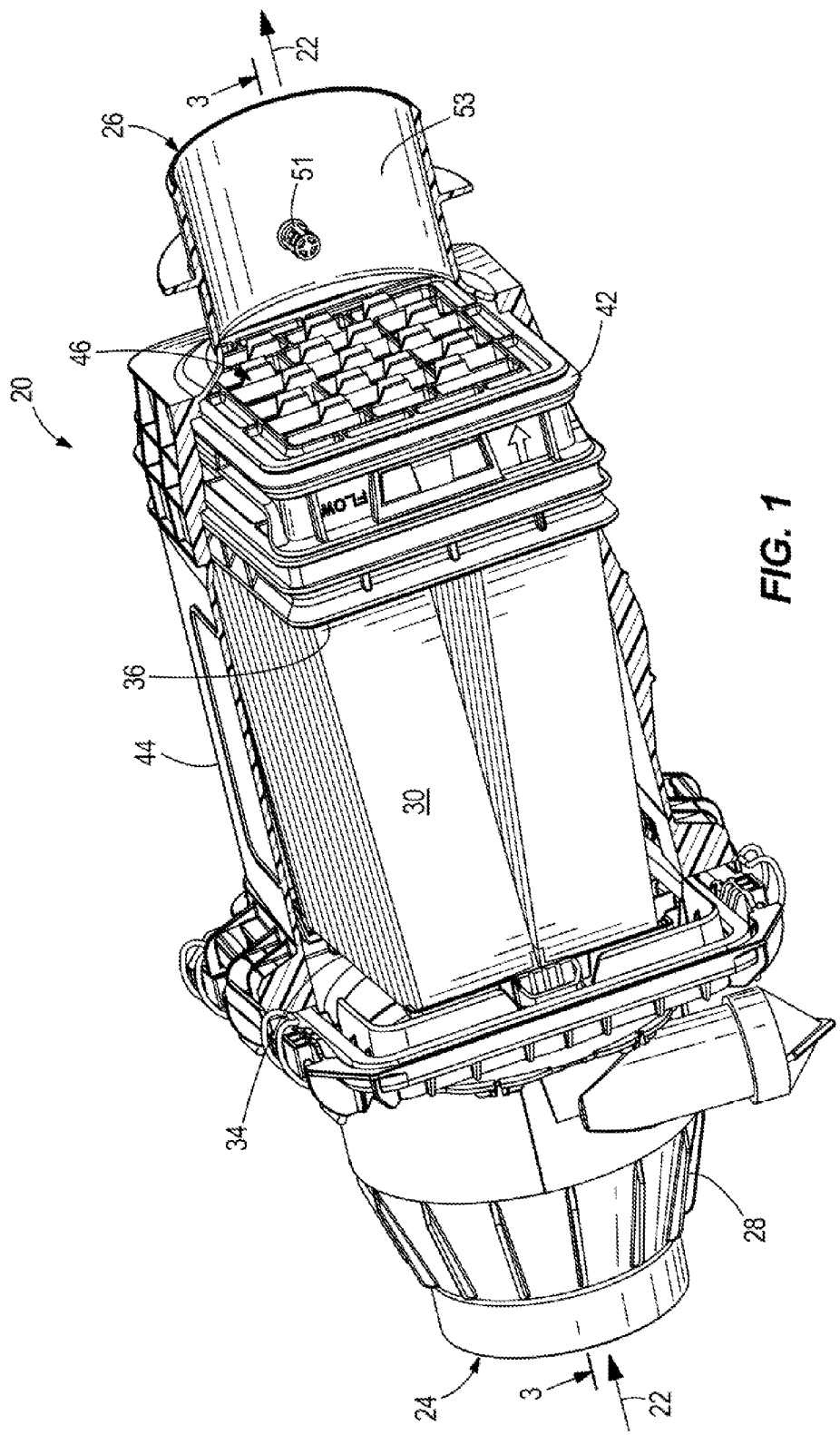
FIG. 1 is a perspective view of an example of an air filter assembly according to the present disclosure.
Figure 2:
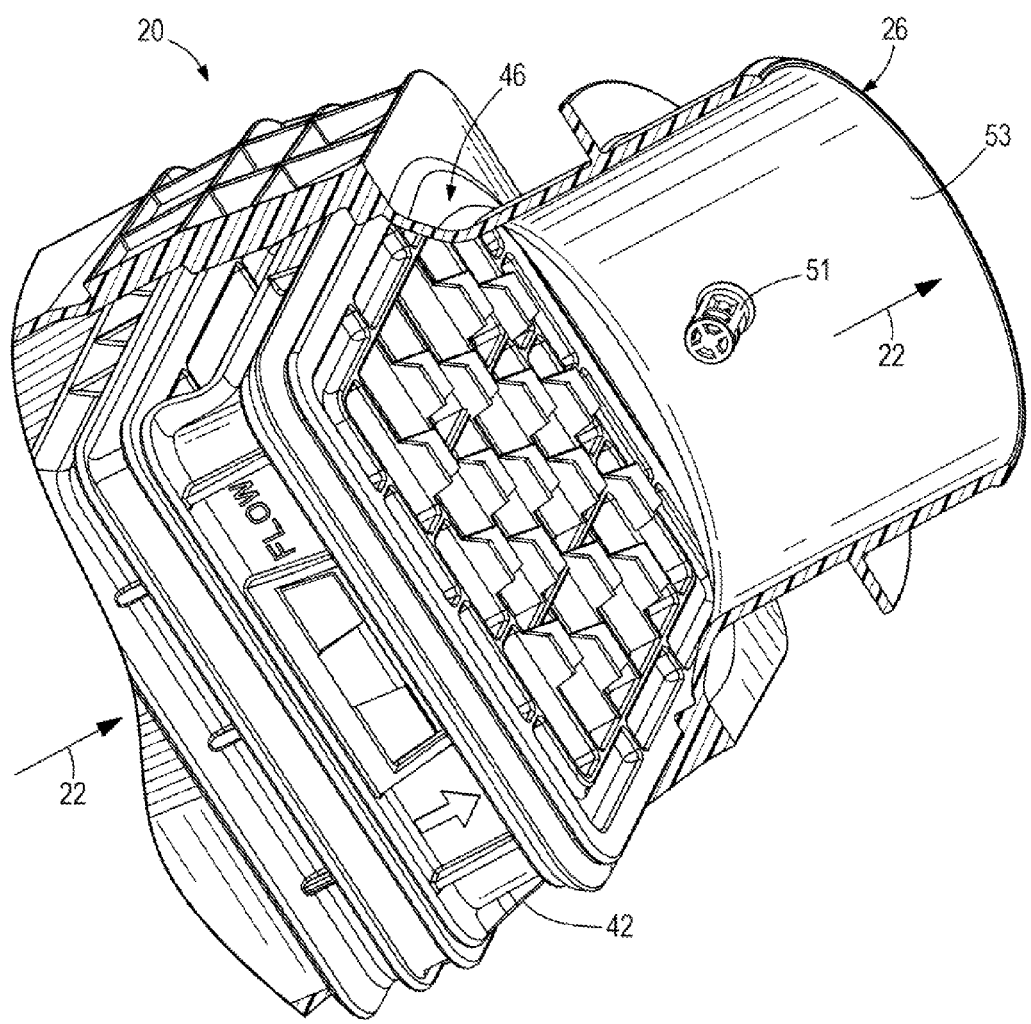
FIG. 2 is a closer view of FIG. 1 showing a plurality of vortex-generating flow guides at an outlet end of the air filter assembly.
Figure 3:
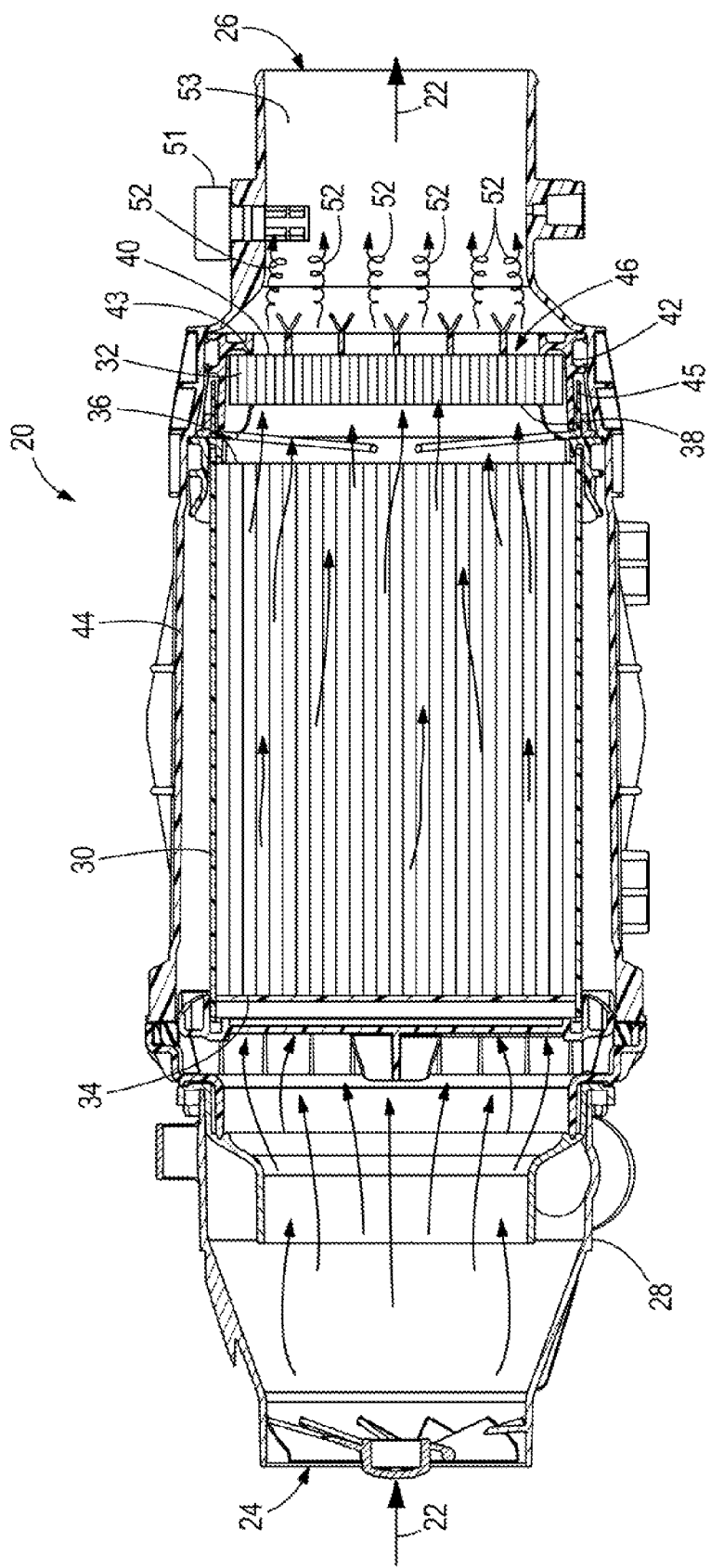
FIG. 3 is a sectional view along section 3-3 in FIG. 1.
Figure 4:
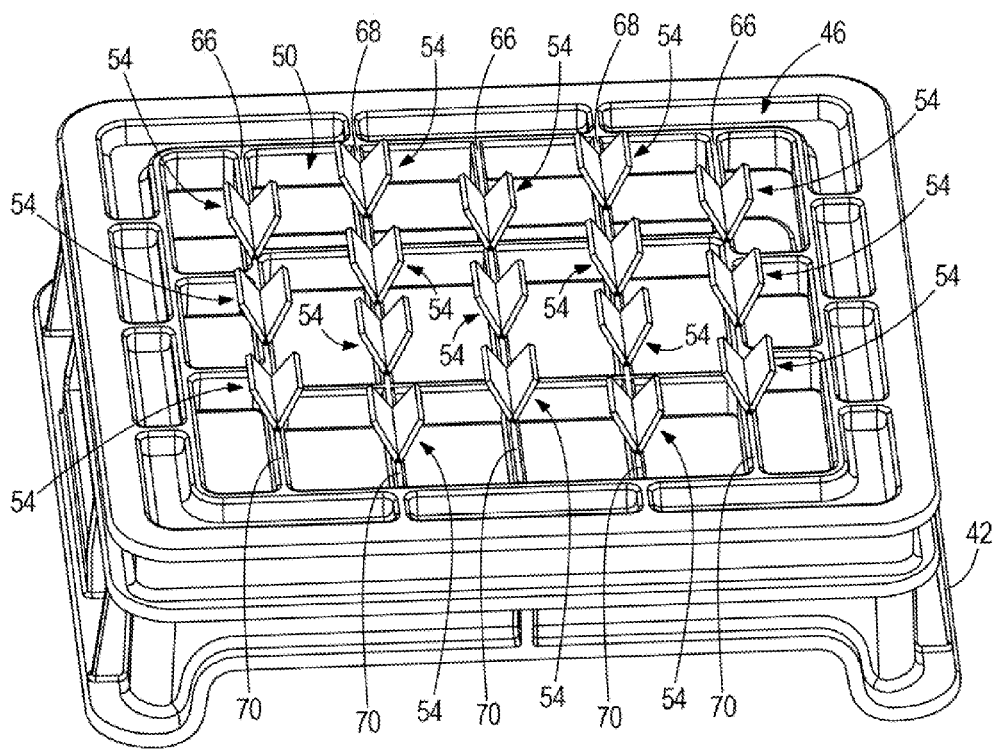
FIG. 4 is a perspective view of one example of a carrier frame having the plurality of vortex-generating flow guides.
Figure 5:
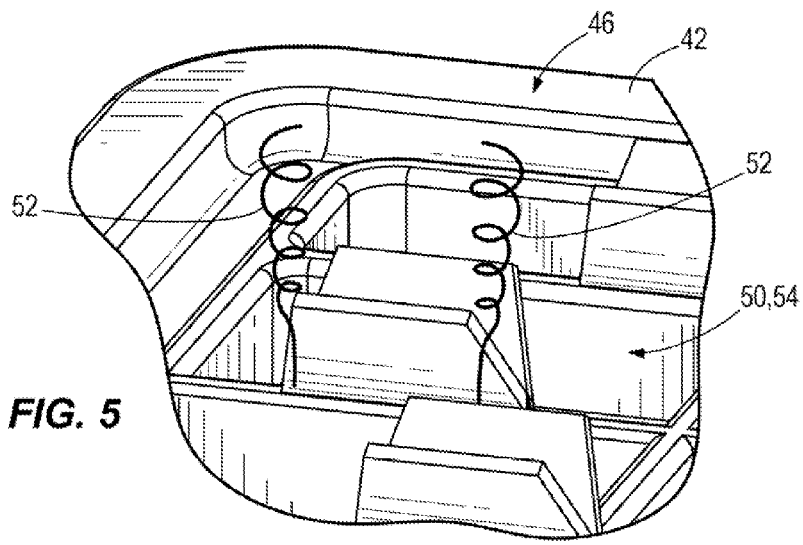
FIG. 5 is a closer view of FIG. 3 showing one of the vortex-generating flow guides.

FIGS. 1-3 depict an air filter assembly 20 for filtering air flowing along an axial direction 22 from an upstream inlet end 24 to a downstream outlet end 26. In this example, the air filter assembly 20 is a direct airflow filter arrangement having an upstream primary filter element 30 and a downstream secondary filter element 32; however this example is not intended to be limiting and the concepts of the present disclosure are also applicable to other types of conventional filter assemblies, including indirect filter assemblies and filter assemblies having one, or three or more filter elements. In the example shown, from upstream to downstream, the air filter assembly 20 has a conventional pre-cleaner 28, the noted primary filter element 30 that filters the airflow from upstream to downstream, and the noted secondary filter element 32 that filters airflow from upstream to downstream. The primary titter element 30 has a dirty air inlet end 34 and a clean air outlet end 36 located downstream of the dirty air inlet end 34. The secondary filter element 32 has a dirty air inlet end 38 and a clean air outlet end 40 located downstream of the dirty air inlet end 38. Further discussion of this type of filter assembly can be found in the incorporated patent documents referenced herein above.

The secondary filter element 32 is carried by a carrier frame 42 supported in a housing 44 of the air filter assembly 20. The carrier frame 42 has an exit side 46 positioned downstream and adjacent the clean air outlet end 40 on the secondary filter element 32. The secondary filter element 32 is supported in the housing 44 by the carrier frame 42. The carder frame 42 provides a first seal 43 between the carrier frame 42 and the secondary filter element 32 and a second seal 45 between the carrier frame 42 and the housing 44, thereby preventing bypass of unfiltered dirty air to the downstream outlet end 26 in the event of rupture or damage to the secondary filter element 32.

The air filter assembly 20 also has a conventional mass airflow (MAF) sensor 51 across which the air flows. In this example, the MAF sensor 51 is located in a sidewall 53 of the housing 44 at the downstream outlet end 26 and senses air flow downstream of the primary and secondary filter elements 30, 32. In other examples, the air filter assembly 20 can include more than one MAF sensor 51 and the location of the MAF sensor(s) 51 can vary from that shown. The MAF sensor can communicate with an engine control unit (not shown) for providing feedback and engine control, as is conventional.

Through experimentation, the present inventors have found that imperfections in manufacture of filter elements, such as pleated filter elements, cause part-to-part velocity variations in the airflow that persist in the downstream outlet end and create flow variability, which results in variability of the output of the MAP sensor 51. Among other things, these imperfections can be the result of pleat bunching, pinching, and/or embossments in the primary and secondary filter elements 30, 32, such as the secondary (safety) filter element 32. The present disclosure relates from endeavors to minimize such variations in the output of MAF sensor 51.

FIGS. 4-10 depict one example of the carrier frame 42 according to the present disclosure. The carrier frame 42 includes a plurality of vortex-generating flow guides 50 that promote rapid mixing of clean air downstream of the secondary filter element 32 and normalization of a uniform velocity profile downstream thereof for flow to the MAF sensor 51, to thereby minimize output variation of the MAF sensor 51 due to imperfect air filter element construction. As will be apparent from the following discussion, the number, location, orientation, size and physical configurations of the vortex-generating flow guides 50 can vary from that shown. The carrier frame 42 can have as few as one vortex-generating flow guide 50. The vortex-generating flow guides 50 can be molded with the exit side 46 of the carrier frame 42. In other examples, the vortex-generating flow guides 50 can be separate components that are attached to the carrier frame 42 for example by a snap fit, by one or more clips, or by other conventional attachment means.

In use, air flows from the upstream inlet end 24 through the pre-cleaner 28, through the primary filter element 30 and through the secondary filter element 32. The air flows out of the clean air outlet end 40 on the secondary filter element 32 along a generally axial flow path 22 until it flows along the vortex-generating flow guide 50 on the carrier frame 42. Because of imperfections in the filter elements, such as the primary and secondary filter elements 30, 32, the air exiting the secondary filter element 32 typically has a non-uniform velocity profile. Advantageously, the vortex-generating flow guides 50 redirect the airflow into at least one vortex flow path 52, thus normalizing of a uniform velocity profile downstream thereof for flow to the MAF sensor 51, to thereby minimize mass airflow variation due to imperfect air filter element construction.

In the example shown in FIGS. 4-10, the vortex-generating flow guides 50 include pairs of tilted trapezoidal tabs 54, which are tilted at some angle from the axial flow path 22 and mounted in a radially staggered pattern or array on the carrier frame 42 to thereby maximize the number of vortex flow paths 52 (see FIGS. 3 and 5) that spin radially away from the axial flow path 22 in the upstream-to-downstream direction. The vortex flow paths 52 induce rapid mixing and dissipation of non-uniformity in the velocity profile exiting the secondary filter element 32, as can be generated by an imperfect filter element construction. In this particular example, the pairs of tilted trapezoidal tabs 54 have like geometry and are tilted at opposite but equal tilt angles (T) (see FIG. 10) with respect to the axial flow path 22. Each tilted trapezoidal tab 54 is planar and has parallel, opposing elongated upstream and downstream edges 58, 60 that both extend perpendicular to the axial flow path 22. The upstream edge 58 is longer than the downstream edge 60. Each tilted trapezoidal tab 54 also has opposing elongated side edges 62a, 62b that extend from the upstream edge 58 to the downstream edge 60 at an edge angle (E). The trapezoidal tabs 54 in each pair have adjacent upstream edges 58 and spaced apart downstream edges 60 and thereby define a V-shape when viewed in cross-section, see FIG. 7.

Figure 6:
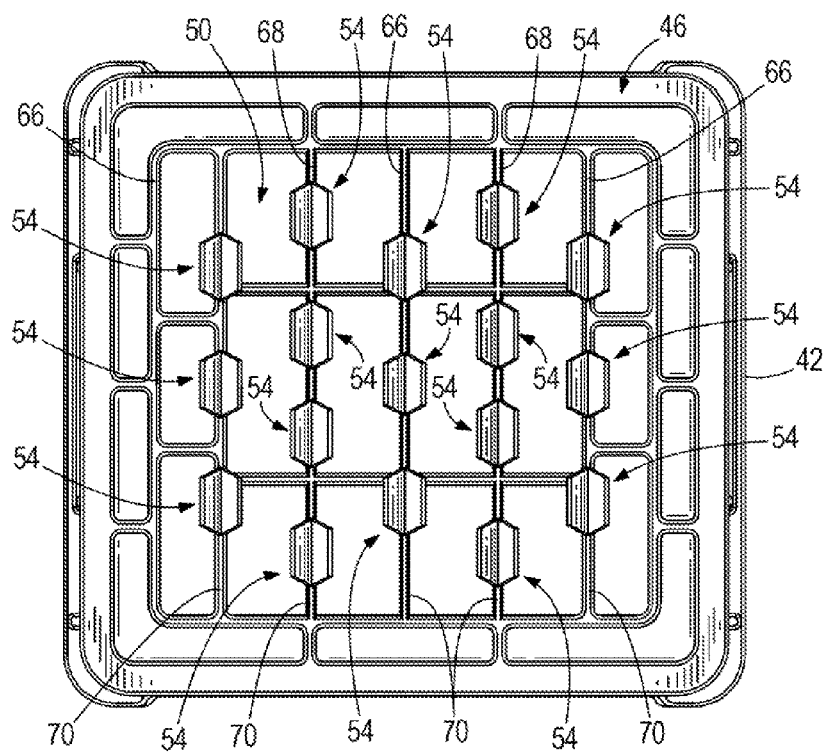
FIG. 6 is a top view of the carrier frame shown in FIG. 3.
Figure 7:
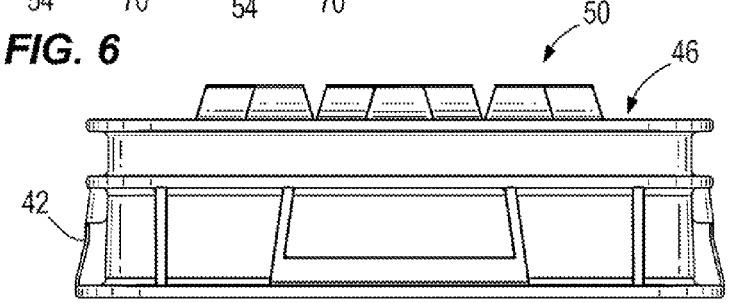
FIG. 7 is a front view of the carrier frame shown in FIG. 3.
Figure 8:
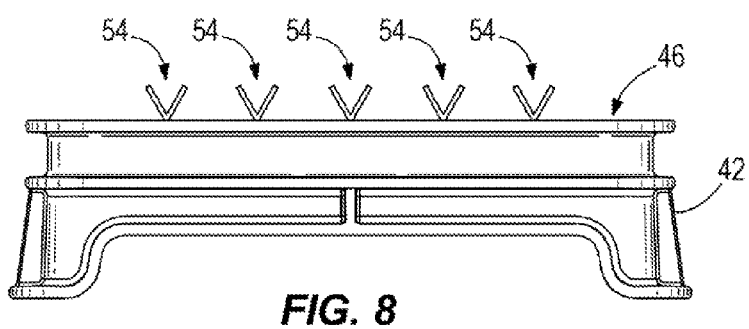
FIG. 8 is a side view of the carrier frame shown in FIG. 3.
Figure 9:
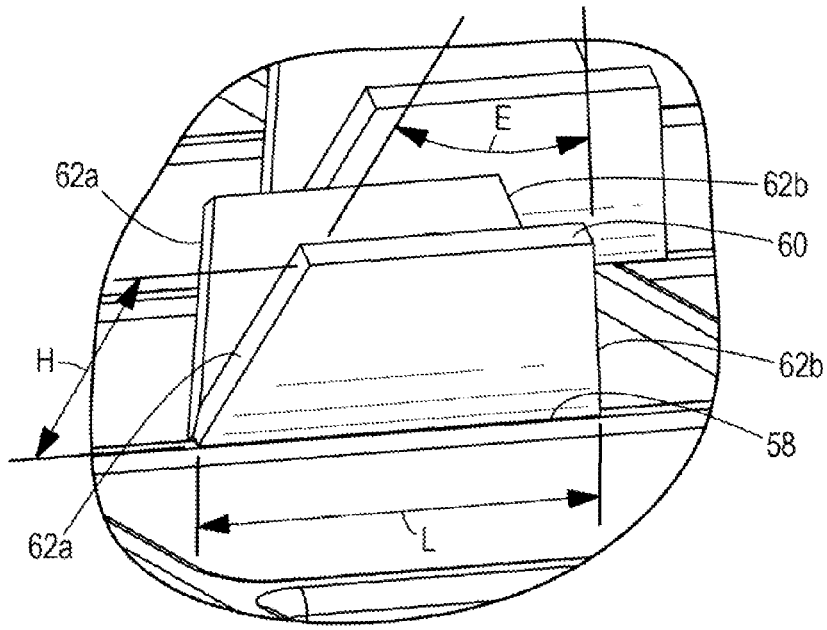
FIG. 9 is a perspective view of a vortex-generating flow guide shown in FIG. 4.
Figure 10:
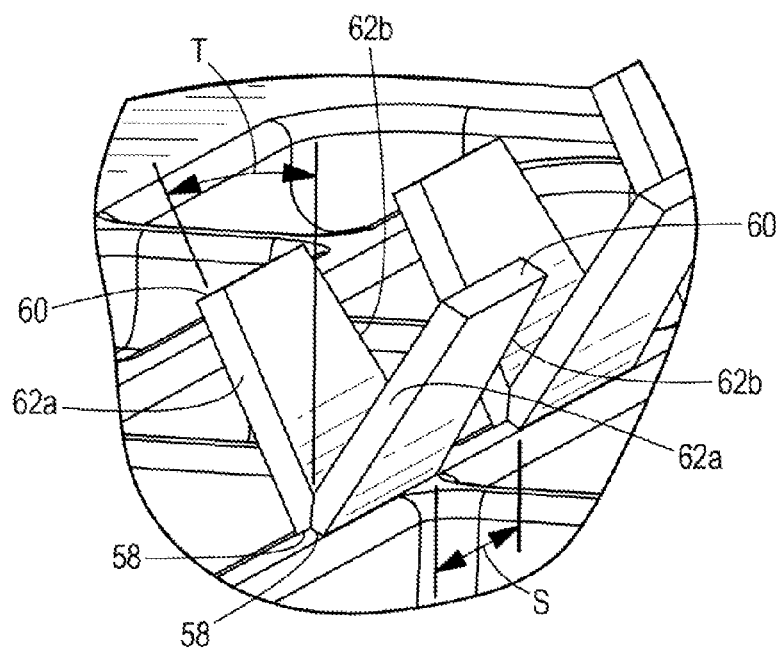
FIG. 10 is another perspective view of the vortex-generating flow guides shown in FIG. 4.
Figure 11:
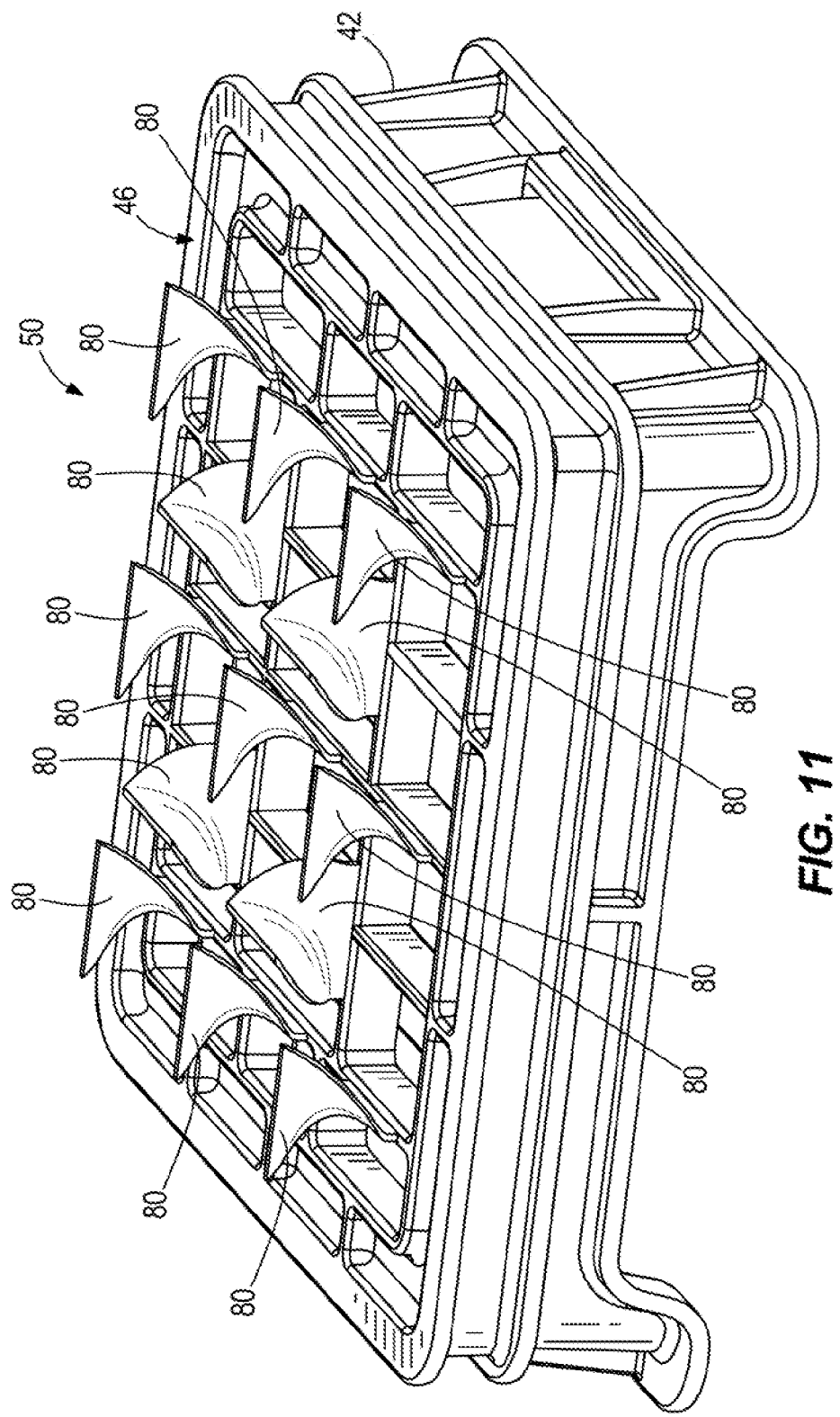
FIG. 11 is perspective view of another example of a carrier frame having the plurality of vortex-generating flow guides.

As shown in FIG. 6, the exit side 46 of the carrier frame 42 has a plurality of pairs of trapezoidal tabs 54 that form the noted radially staggered array, which includes interdigitated first and second rows 66, 68 of pairs of trapezoidal tabs 54, the first row 66 having less pairs of trapezoidal tabs 54 than the second row 68. The pairs of trapezoidal tabs 54 in the first row 66 have elongated upstream edges 58 that are parallel with respect to the upstream edges 58 of the second row 68 of pairs of trapezoidal tabs 54. The pairs of trapezoidal tabs 54 in the first rows 66 are radially offset or staggered from the pairs of trapezoidal tabs 54 in the second row 68. The pairs of trapezoidal tabs 54 in both the first and second rows 66, 68 are spaced apart from the other pairs of trapezoidal tabs 54 in the respective row by a spacing (S). A plurality of spaced apart cross ribs 70 support the staggered array of pairs of trapezoidal tabs 54.

FIGS. 4-10 illustrate the upstream edges 58 of all trapezoidal tabs 54 being parallel on the carrier frame 42; however in one of the many possible alternative arrangements that are contemplated by this disclosure, the upstream edges 58 of some of the pairs of tilted trapezoidal tabs 54 in the plurality can be staggered at 90 degree angles relative to the upstream edges 58 of other pairs of tilted trapezoidal tabs 54 in the plurality. For example the pairs of trapezoidal tabs 54 in the first row 66 can be radially oriented 90 degrees from the pairs of trapezoidal tabs 54 in the second row 68 such that the upstream edges 58 of the pairs of trapezoidal tabs 54 in the first row 66 are radially oriented 90 degrees from the upstream edges 58 of the pairs of trapezoidal tabs 54 in the second row 68. Alternately, the upstream edges 58 of the pairs of trapezoidal tabs 54 in the first and second rows 66, 68 can be arranged at other angles with respect to each other. Alternately, the upstream edges 58 of the pairs of trapezoidal tabs 54 in each of the first and second rows 66, 68 can be arranged at different angles than other trapezoidal tabs 54 in the same first and second row 66, 68. The pairs of trapezoidal tabs 54 could also be arranged in an axially staggered pattern, wherein certain trapezoidal tabs 54 are located further upstream and/or downstream of other trapezoidal tabs 54 in the plurality.

The geometrical dimensions of the trapezoidal tabs 54 can also vary from that shown in the figures. Dimensional parameters of the trapezoidal tabs 54 include the lengths of the upstream and downstream edges 58, 60, the height (H) of the side edges 62a, 62b, the ratio of the length (L) of the upstream edge 58, to the height (H) of the side edges 62a, 62b, and angle of tilt (T) of the tilted trapezoidal tabs 54 to the axial flow path 22, the angle (E) of the side edges 62a, 62b, and the spacing (S) between the pairs of tilted trapezoidal tabs 54. In the drawings, the edge angle (E) equals 30 degrees, the tilt angle (T) equals 28 degrees, the height (H) of the side edges 62a, 62b equals 8 millimeters, the length (L) of the upstream edges 58 equals 14 millimeters, the length (L) to height (H) ratio equals 0.57, the tab spacing (S) equals 6 millimeters, and the tab spacing (S) divided by length (L) equals 0.42. However these dimensions can vary based upon various factors including the particular configuration of the air filter assembly 20. In certain examples, the edge angle (E) can vary from 0-45 degrees, the tilt angle (T) can vary from 10-45 degrees, the tab height (H) can vary from 5 millimeters to 35 millimeters, tab length (L) can vary from 5 mm to 35 mm, the length (L) to height (H) ratio can vary from 0.25 to 4, and the tab spacing (S) to length (L) ratio can vary from 0.1 to 2. Other combinations are possible and contemplated.

FIGS. 11-14 depict another example of a carrier frame 42 having a plurality of vortex-generating flow guides 50. In this example, the vortex-generating flow guides 50 include helical vanes 80. Each helical vane 80 has an elongated upstream edge 82 and an elongated downstream edge 84. The elongated upstream edge 82 is orientated at a twist angle (A) with respect to the elongated downstream edge 84. Opposing helical side edges 88, 90 extend between the upstream and downstream edges 82, 84. A helical surface 92 directs airflow in the noted vortex flow path.

Figure 12:
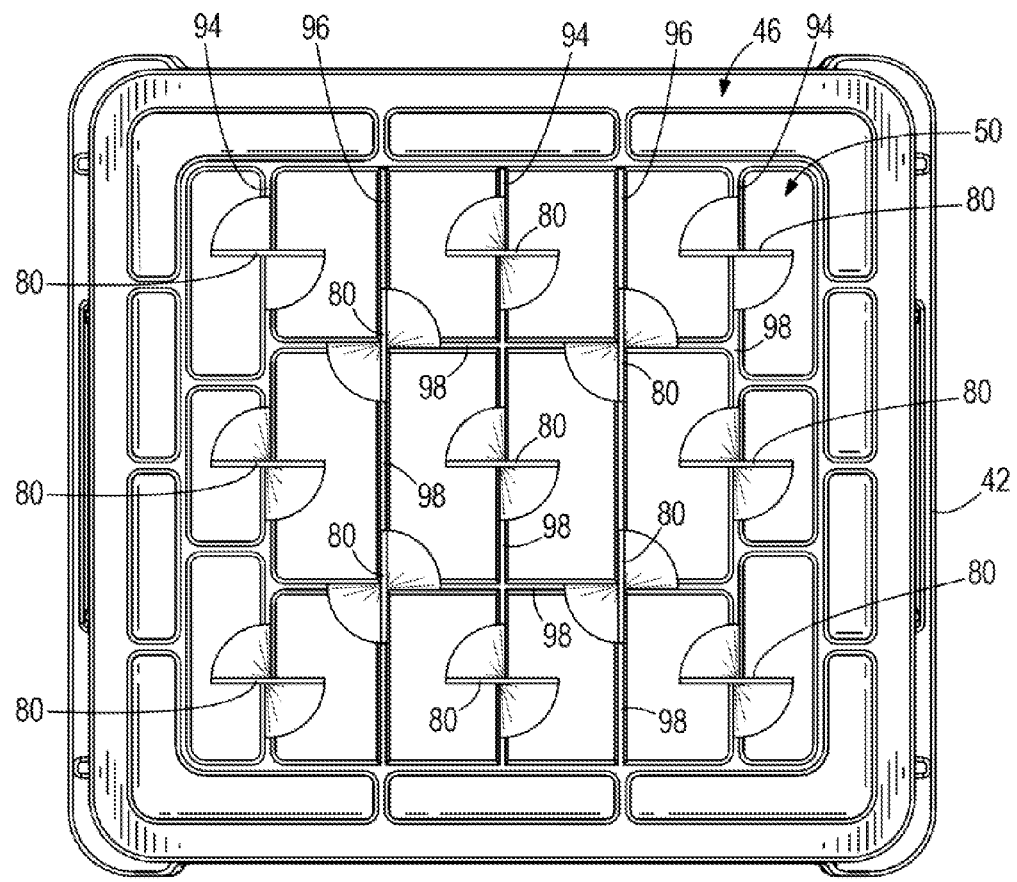
FIG. 12 is a top view of the carrier frame shown in FIG. 11.
Figure 13:
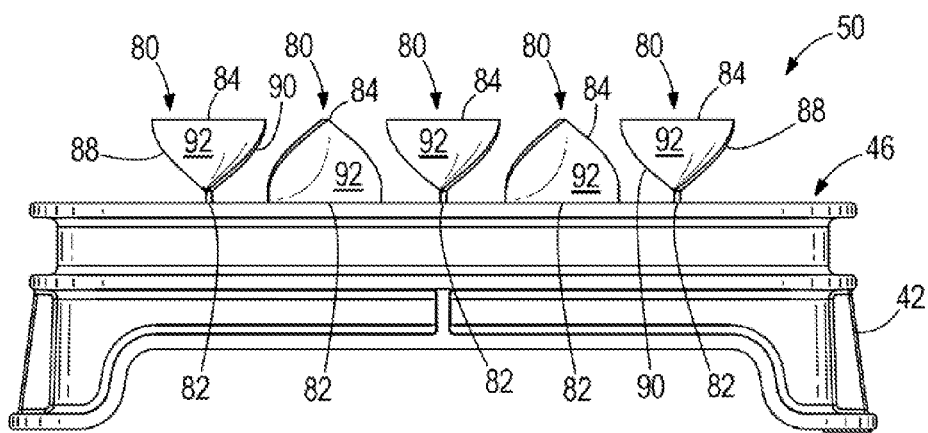
FIG. 13 is a side view of the carrier frame shown in FIG. 11.
Figure 14:
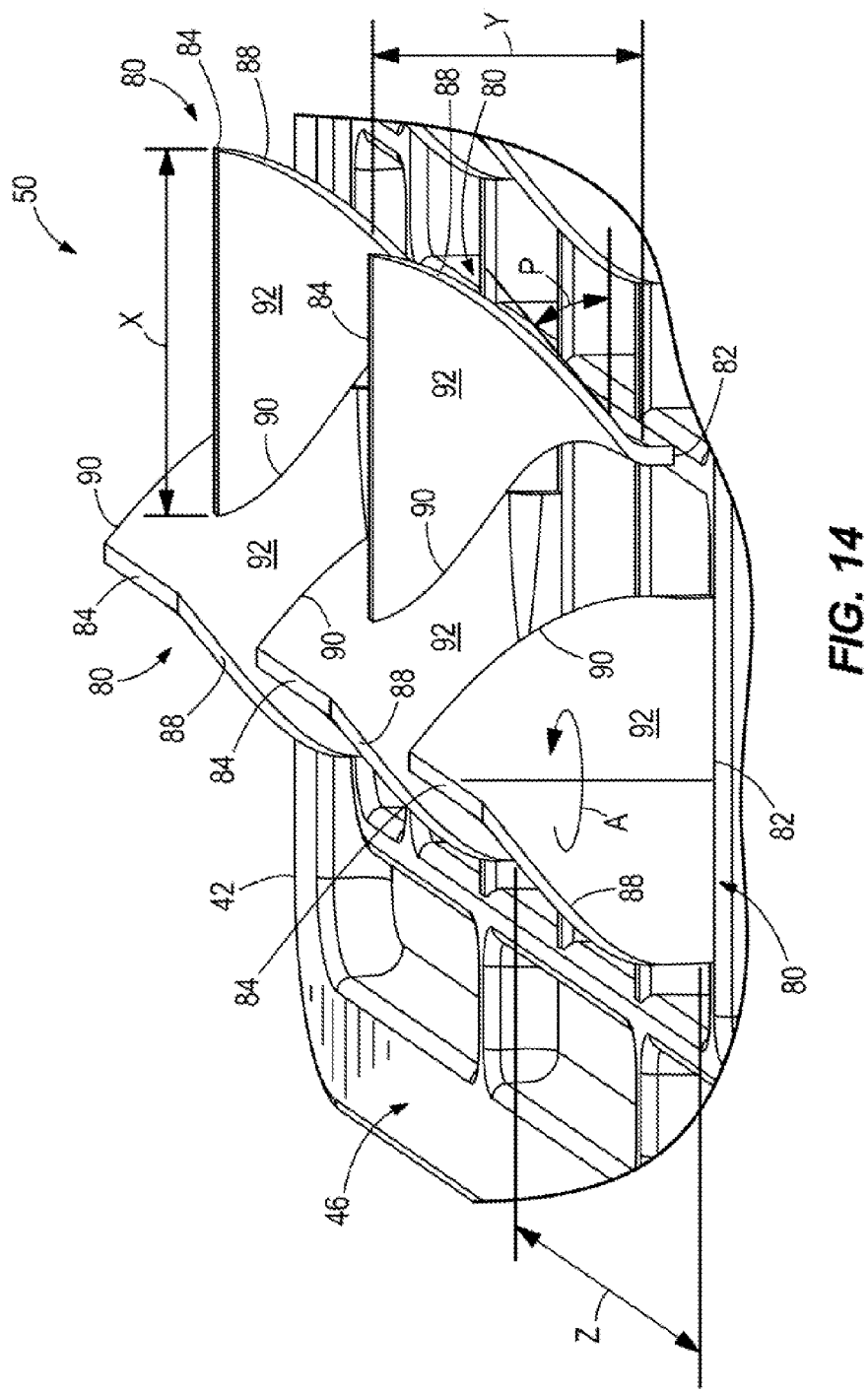
FIG. 14 is a perspective view of a vortex-generating flow guide shown in FIG. 11.

As shown in FIG. 12, the helical vanes 80 are arranged on the exit side 46 of the carrier frame 42 in a radially staggered pattern or array that includes interdigitated first and second rows 94, 96 of helical vanes 80. The first rows 94 have more helical vanes 80 than the second rows 96 and the helical vanes 80 in the first row 94 are radially offset from the helical vanes 80 in the second row 96. A plurality of radially spaced apart cross ribs 98 form a grid that supports the radially staggered array of helical vanes 80. The elongated upstream edge 82 and elongated downstream edges 84 of the helical vanes 80 in the first row 94 are offset 180 degrees when compared to the elongated upstream edges and elongated downstream edges 82, 84 of the helical vanes 80 in the second row 96. As such, the helical vanes 80 in the first rows 94 have upstream edges 82 that are transversely orientated from the upstream edges 82 of the helical vanes 80 in the second row 96.

The geometrical parameters for the helical, vanes 80 can vary and include vane width (X), vane height (Y), vane depth (Z), ratio of vane width (X) to vane height (Y), and degrees of twist (A) and/or pitch (P) angle. The drawings depict helical vanes 80 having, a vane width (X) of 19 millimeters, a vane height (Y) of 15 millimeters, a height (Y) to width (X) ratio of 0.79, and a twist angle (A) of 90 degrees. In certain examples, the vane width (X) can range from 5 to 25 millimeters, the vane height (Y) can range from 5 to 25 millimeters, the twist angle (A) can range from 10 to 220 degrees, the pitch angle (P) can range from 10 to 60 degrees and the ratio of height (Y) to width (X) can range from 0.25 to 4. Similar to the example in FIGS. 4-10, the spacing (S) between the helical vanes 80 can also vary. Other combinations are possible and contemplated.

The examples shown in FIGS. 10-13 utilize twisted helical vanes, i.e. single twisted vanes having 90 degree twist angles (A). In alternate examples, the helical vanes 80 could be multi-vane, having for example two vanes per location and a central hub. In the examples shown, the helical vanes 80 are all rotationally right-handed with respect to the axial flow path 22. In alternate examples, the helical, vanes 80 could all be left-handed with respect to the axial flow path 22, or the plurality of helical vanes 80 could include both right-handed and left-handed helical vanes to induce additional vortex interaction/dissipation. As illustrated, the helical vanes 80 have a constant helical pitch (P). In other examples, the helical vanes 80 could have compound pitch and/or complexly curved surfaces to maximize the amount of vorticity or swirl for a given pressure drop caused by the presence of the helical vanes 80. The helical vanes 80 could also be arranged in an axially staggered pattern, wherein certain helical vanes 80 are located further upstream and/or downstream of other helical vanes 80 in the plurality.

The present disclosure thus provides a carrier frame for a primary or secondary (safety) filter element that is configured with integrated vortex-generating features, such as tilted trapezoidal tabs or helical vanes that promote rapid mixing and quicker establishment of uniform velocity profile downwind where a MAF sensor is located, thereby minimizing MAF sensor variation due to imperfect air filter construction. The present inventors have recognized that secondary (i.e. safety) filters used in direct flow filter assembly configurations cannot be made perfectly, i.e. the secondary filters have some degree of non-uniform pleat spacing, varying pleat shape, embossment variation, or even base media permeability variation. These imperfections cause variation in the effective permeability of the filter elements, which then causes corresponding variation in the localized outlet velocity from the filter assembly, which persist downwind to the location of the MAF sensor. This causes the MAF sensor, which senses a fairly small local velocity within the duct, to report slightly differing mass airflow with different filters and/or rotational position (i.e. if the filter is rotated 180 degrees and reassembled). Examples provided in the present disclosure enable use of conventional pleated filter element structures, while minimizing the MAF sensor variability caused by unavoidable variations in the manufacture of the filter elements.

The concepts of the present disclosure are applicable to different filter assemblies from that shown in the drawing figures. For example, when direct flow filters are used in on-highway applications, the secondary filter element typically is not used. Although the velocity jet exiting the gap of direct flow primary filter elements helps to reduce the flow variations caused by filter imperfections, the improvements disclosed in the present application can equally be applied to these types of arrangements. Also, in arrangements where airflow enters the gap of the direct flow primary filter, a diverging flow path is created downstream which can result in a non-uniform velocity profile at the MAF sensor. Many primary filters in automotive applications include deep pleated or rolled constructions which present the same challenges as described herein for the direct flow secondary filter element. The concepts of the present disclosure can equally be applied to these types of arrangements.

The drawings figures thus depict a carrier frame supporting an air filter element having a dirty air inlet and a clean air outlet and filtering air flowing therethrough from upstream to downstream. The carrier frame has an exit side at the clear air outlet. The exit side has a vortex-generating flow guide promoting rapid mixing of clean air downstream of the air filter element and normalization of a uniform velocity profile downstream thereof for flow to a mass air flow (MAF) sensor, to minimize MAF variation due to imperfect air filter element construction. The noted air filter element can be at least one of a primary filter element and a secondary or safety filter element. The air filter element can include a pleated filter media. The air flows through the clean air outlet along a generally axial flow path until the air flows along the vortex-generating flow guide, which redirects the air flow into at least one vortex flow path.

In certain examples, the vortex-generating flow guide can include to tilted trapezoidal tab that extends at a tilt angle with respect to the axial flow path. The tilted trapezoidal tab can be planar and have parallel opposing elongated upstream and downstream edges that extend perpendicular to the axial flow path. The tilted trapezoidal tab further can have opposing elongated side edges that extend from the upstream edge to the downstream edge, wherein the upstream edge is longer than the downstream edge. The tilted trapezoidal tab can be tilted at an angle of 10-45° with respect to the axial flow path.

The tilted trapezoidal tab can be one of a pair of tilted trapezoidal tabs that have the same geometry and that are tilted at opposite but equal angles with respect to the axial flow path. The pair of tilted trapezoidal tabs have adjacent upstream edges and spaced apart downstream edges. The pair of tilted trapezoidal tabs form a V-shape when viewed in cross-section. The pair of tilted trapezoidal tabs can be one of a plurality of pair of tilted trapezoidal tabs that have the same geometry. The plurality of pairs of tilted trapezoidal tabs can form a radially staggered array of pairs of tilted trapezoidal tabs that comprise first and second rows of pairs of trapezoidal tabs. The first row has less pairs of trapezoidal tabs than the second row. The pairs of trapezoidal tabs in the first row are radially offset with respect to the pairs of trapezoidal tabs in the second row. The first row of pairs of tilted trapezoidal tabs have elongated upstream edges. The second row of pairs of tilted trapezoidal tabs have elongated upstream edges. The upstream edges of the pairs of tilted trapezoidal tabs in the first row are parallel with respect to the upstream edges of the pairs of tilted trapezoidal tabs in the second row. A plurality of spaced apart cross ribs support the array of pairs of tilted trapezoidal tabs.

In certain examples, the vortex-generating flow guide can comprise a helical vane. The helical vane can comprise an elongated upstream edge and an elongated downstream edge. The upstream edge is transversely orientated at a twist angle with respect to the downstream edge. The helical vane comprises opposing helical side edges extending between the upstream and downstream edges and a helical surface between the upstream and downstream edges and between the opposing helical side edges. The helical surface directs air flow into the vortex flow path.

The helical vane can be one of an array of helical vanes including first and second rows of helical vanes. The first row of helical vanes can be offset from the second row of helical vanes. The helical vanes in the first row can have upstream edges that are radially transversely orientated from upstream edges of the helical vanes in the second row. A plurality of spaced apart cross ribs can support the staggered array of helical vanes.

The carrier frame can be supported in a housing. The air filter element can be supported in the housing by the carrier frame, which provides a first seal between the carrier frame and the air filter element and a second seal between the carrier frame and the housing, thereby preventing bypass of unfiltered dirty air to the MAF sensor in the event of a rupture or damage to the air filter element.

What is claimed is:

1. A carrier frame supporting an air filter element having a dirty air inlet and a clean air outlet, the air filter element filtering air flowing therethrough from upstream to downstream, the carrier frame comprising:

an exit side positioned downstream and adjacent the clean air outlet; and a vortex-generating flow guide mounted on the exit side, the vortex-generating flow guide comprising:

a plurality of spaced-apart cross-ribs; and a radially staggered array of pairs of tilted trapezoidal tabs mounted on the plurality of spaced-apart cross-ribs, each of the pairs of tilted trapezoidal tabs comprising:

a first upstream edge having a first end and a second end and a second upstream edge having a third end and a fourth end mounted on a cross-rib, the first upstream edge extending along a first length of the cross-rib and the second upstream edge extending along the first length of the cross-rib such that the first end of the first upstream edge is aligned with the third end of the second upstream edge and the second end of the first upstream edge is aligned with the fourth end of the second upstream edge, and a first downstream edge and a second downstream edge positioned downstream from the cross-rib, the first downstream edge spaced apart from the second downstream edge, wherein the vortex-generating flow guide promotes rapid mixing of clean air downstream of the air filter element and normalizes a uniform velocity profile downstream thereof such that mass airflow variation is minimized for flow to a mass airflow sensor positioned downstream of the vortex-generating flow guide.

2. The carrier frame according to claim 1, wherein the first upstream edge and the second upstream edge are longer than the first downstream edge and the second downstream edge; and wherein the pairs of tilted trapezoidal tabs have opposing elongated side edges that extend from the first upstream edge and the second upstream edge to the first downstream edge and the second downstream edge.

3. The carrier frame according to claim 1, wherein the pairs of tilted trapezoidal tabs form a V-shape when viewed in cross section.

4. The carrier frame according to claim 1, wherein the carrier frame is supported in a housing, the air filter element is supported in the housing by the carrier frame, the carrier frame provides a first seal between the carrier frame and the air filter element, and the carrier frame provides a second seal between the carrier frame and the housing, thereby preventing bypass of unfiltered dirty air to the mass airflow sensor in the event of a rupture of or damage to the air filter element.

5. The carrier frame according to claim 1, wherein the air filter element comprises at least one of a primary filter element and a secondary or safety filter element.

6. The carrier frame according to claim 5, wherein the air filter element comprises a pleated filter media.

7. The carrier frame according to claim 1, wherein the pairs of tilted trapezoidal tabs are tilted trapezoidal tabs having the same geometry and are tilted at opposite but equal angles with respect to the axial flow path.

8. The carrier frame according to claim 7, wherein the radially staggered array of pairs of tilted trapezoidal tabs have the same geometry.

9. The carrier frame according to claim 8, wherein the radially staggered array of pairs of tilted trapezoidal tabs comprises first and second rows of pairs of trapezoidal tabs, the first row having less pairs of trapezoidal tabs than the second row; and wherein the pairs of trapezoidal tabs in the first row are radially offset with respect to the pairs of trapezoidal tabs in the second row.

10. The carrier frame according to claim 9, wherein the first row of pairs of tilted trapezoidal tabs have elongated upstream edges and the second row of pairs of tilted trapezoidal tabs have elongated upstream edges; and wherein the upstream edges of the pairs of tilted trapezoidal tabs in the first row are parallel to the upstream edges of the pairs of tilted trapezoidal tabs in the second row.

11. The carrier frame according to claim 1 wherein the air flows through the clean air outlet along a generally axial flow path until the air flows along the vortex-generating flow guide, which redirects the airflow into at least one vortex flow path.

12. The carrier frame according to claim 11, wherein the pairs of tilted trapezoidal tabs extend at a tilt angle with respect to the axial flow path.

13. The carrier frame according to claim 12, wherein the pairs of tilted trapezoidal tabs are planar and the first and second upstream edges and first and second downstream edges extend perpendicular to the axial flow path.

14. The carrier frame according to claim 13, wherein the pairs of tilted trapezoidal tabs are tilted at an angle of 10 to 45 degrees with respect to the axial flow path.

15. The carrier frame according to claim 11, wherein the vortex-generating flow guide comprises a helical vane.

16. The carrier frame according to claim 15, wherein the helical vane comprises an elongated upstream edge and an elongated downstream edge, wherein the upstream edge is transversely oriented at a twist angle with respect to the downstream edge.

17. The carrier frame according to claim 16, wherein the helical vane comprises opposing helical side edges extending between the upstream and downstream edges.

18. The carrier frame according to claim 17, wherein the helical vane comprises a helical surface between the upstream and downstream edges and between the opposing helical side edges, the helical surface directing the airflow into the vortex flow path.

19. The carrier frame according to claim 18, wherein the helical vane is one of an array of helical vanes that comprises a first and a second row of helical vanes.

20. The carrier frame according to claim 19, wherein the first row of helical vanes is radially offset from the second row of helical vanes.

21. The carrier frame according to claim 20, wherein the helical vanes in the first row have upstream edges that are radially transversely oriented from upstream edges of the helical vanes in the second row.

22. The carrier frame according to claim 19, comprising a plurality of spaced-apart cross-ribs that support the staggered array of the helical vanes.

* * * * *